US012523629B2

(12) United States Patent
Arduini et al.

(10) Patent No.: US 12,523,629 B2
(45) Date of Patent: Jan. 13, 2026

(54) NANO- AND/OR MICRO-STRUCTURED PRINTED ELECTRODES

(71) Applicant: TECNOSENS S.R.L., Rome (IT)

(72) Inventors: Fabiana Arduini, Rome (IT); Daniela Neagu, Rome (IT); Maria Rita Tomei, Rome (IT); Antonio Boccella, Rome (IT); Danila Moscone, Rome (IT)

(73) Assignee: TECNOSENS S.R.L., Rome (IT)

( * ) Notice: Subject to any disclaimer, the term of this patent is extended or adjusted under 35 U.S.C. 154(b) by 0 days.

(21) Appl. No.: 18/165,395

(22) Filed: Feb. 7, 2023

(65) Prior Publication Data

US 2023/0194458 A1    Jun. 22, 2023

Related U.S. Application Data

(63) Continuation of application No. 16/609,306, filed as application No. PCT/EP2018/061383 on May 3, 2018, now abandoned.

(30) Foreign Application Priority Data

May 3, 2017    (IT) .................. 102017000046831

(51) Int. Cl.
    *G01N 27/30*    (2006.01)
(52) U.S. Cl.
    CPC .......... *G01N 27/307* (2013.01); *G01N 27/308* (2013.01)
(58) Field of Classification Search
    CPC ............. G01N 27/307–308; G01N 27/30–301
    See application file for complete search history.

(56) References Cited

U.S. PATENT DOCUMENTS

| 5,518,601 A | 5/1996 | Foos et al. |
| 6,599,408 B1 | 7/2003 | Chan et al. |
| (Continued) | | |

FOREIGN PATENT DOCUMENTS

| CN | 107202823 A | 9/2017 |
| DE | 4211198 C2 | 10/1993 |
| (Continued) | | |

OTHER PUBLICATIONS

Cinti S., et al., "Carbon black assisted tailoring of Prussian Blue nanoparticles to tune sensitivity and detection limit towards H2O2 by using screen-printed electrode", Electrochemistry Communications, vol. 47, Aug. 2014, pp. 63-66.

(Continued)

*Primary Examiner* — James Lin
*Assistant Examiner* — Vivian A Tran
(74) *Attorney, Agent, or Firm* — Silvia Salvadori, P.C.; Silvia Salvadori

(57) ABSTRACT

The present invention relates to new electrochemical probes for the measure of an analyte selected from the group consisting of: free chlorine, chlorine dioxide, total chlorine and peracetic acid; characterized in that said probe includes at least a printed electrode nano- or micro-structured with a nano- or micromaterial selected from the group consisting of: nano- or microparticles of carbon black and/or nano- or microparticles of a metal selected from the group consisting of gold, silver, platinum, copper and combinations or alloys thereof.

7 Claims, 15 Drawing Sheets

(56) References Cited

U.S. PATENT DOCUMENTS

| | | | | |
|---|---|---|---|---|
| 6,627,058 | B1* | 9/2003 | Chan | C12Q 1/006 252/503 |
| 7,790,006 | B2 | 9/2010 | Feng et al. | |
| 2001/0042692 | A1 | 11/2001 | Gurry et al. | |
| 2003/0205465 | A1 | 11/2003 | Feng | |
| 2006/0249382 | A1 | 11/2006 | Hengstenberg et al. | |
| 2009/0301876 | A1* | 12/2009 | Wagner | G01N 27/30 204/415 |
| 2009/0321278 | A1 | 12/2009 | Birch et al. | |
| 2014/0083864 | A1 | 3/2014 | Rowhani et al. | |
| 2014/0367277 | A1 | 12/2014 | Crawford et al. | |
| 2015/0126854 | A1 | 5/2015 | Keast et al. | |
| 2015/0338367 | A1 | 11/2015 | Hu et al. | |
| 2016/0320326 | A1* | 11/2016 | Zevenbergen | G01N 27/413 |

FOREIGN PATENT DOCUMENTS

| | | | |
|---|---|---|---|
| DE | 4319002 | A1 | 2/1995 |
| EP | 2453229 | B1 | 5/2012 |
| GB | 2160322 | A | 12/1985 |
| JP | 2012083314 | A | 4/2012 |
| JP | 2016212095 | A | 12/2016 |
| RU | 2187798 | C1 | 8/2002 |
| WO | 9504271 | A1 | 2/1995 |
| WO | 2011130545 | | 10/2011 |
| WO | 2016015028 | A1 | 1/2016 |
| WO | 2016124874 | A1 | 8/2016 |
| WO | 2017030930 | | 2/2017 |
| WO | 2017030934 | | 2/2017 |
| WO | 2017040947 | A1 | 3/2017 |

OTHER PUBLICATIONS

International Search Report of PCT/EP2018/061383 of Oct. 29, 2018.

Written Opinion of PCT/EP2018/061383 of Oct. 29, 2018.

Arduini F et al., "Effective electrochemical sensor based on screen-printed electrodes modified with a carbon black-AU nanoparticles composite", Sensors and Actuators B 212 (2015) 536-543.

Arduini F et al., "High performance electrochemical sensor based on modified screen-printed electrodes with cost-effective disperson of nanostructured carbon black", Electrochemistry Communications 12 (2010) 346-350.

Bhatt A I et al., "Hydrodynamic voltammetry at membrane-covered electrodes" Journal of Electroanalytical Chemistry 584 (2005) 131-140.

Calvo Quintana et al., Part I: a comparative study of bismuth-modified screen-printed electrodes for lead detection:, Analytica Chimica Acta 707 (2011) 171-177.

Camanha Vicentini F et al., "Nanostructured carbon black for simultaneous sensing in biological fluids", Sensors and Actuators B 227 (2016) 610-618.

Campanha Vicentini F et al., "Imparting improvements in electrochemical sensors: evaluation of different carbon blacks that give rise to significant improvement in the performance of electroanalytical sensing platforms", Electrochimica Acta 157 (2015) 125-133.

Cinti S. et al., "Screen-printed electrodes modified with carbon nanomaterials: a comparison among carbon black, carbon nanotubes and graphene", Electronalysis, 2015, 27, 1-10.

European office action issued on Aug. 3, 2022 for applicaiton No. 18724498.3.

European office action issued on Aug. 3, 2022 in counterpart European patent application No. 18724498.3-1001.

Guo S et al., "Synthesis and electrochemical applications of gold nanoparticles", Analytical Acta 598 (2007) 181-192.

Ivaska A et al., "Application of an amperometric sensor to in-line monitoring of pulp bleaching with chlorine dioxide", Analytica Chimica Acta, 238 (1990) 223-229.

Letter reporting Janapese office action issued on Dec. 13, 2022 in counterpart Japanese application No. 2019-559331.

Letter reporting japanese office action issued Mar. 22, 2022 in connection with counterpart Janapese application No. 2019-559331.

Metters J P et al., "New directions in screen printed electroanalytical sensors: an overview of recent developments", Analyst 2011, 136, 1067.

Office action issued Dec. 5, 2022 in counterpart Japanese patent application No. 2019-559331.

Office Action issued in counterpart Japanese patent application nol 2019-559331 on Mar. 14, 2022.

Office Action issued on Sep. 28, 2021 in counterpart Russian application No. 2019138625.

Office Action. issued on Mar. 20, 2028 in connection with counterpart italian application No. IT201700046831.

Oikawa K et al., "Determination of CLO2 using CLO2 selective electrode", Chemistry Letters, pp. 2459-2462, 1992.

Ordeig O et al., "Continuous detection of hypochlorous acid/hypochlorite for water quality monitoring and control", Electroanalysis 2005, 17, No. 18.

Quentel F et al., "Determination of trace levels of chlorine dioxide in drinking water by electrochemistry", Analysis (1996) 24, 203-211.

Quentel F et al., "Electrochemical determination of low levels of residual chlorine dioxide in tap water", Analytica Chimica Acta 295 (1994) 85-91.

Rassaei L et al., "Nanoparticles in electrochemical sensors for environmental monitoring", Trends in Analytical Chemistry, vol. 30, No. 11, 2011.

Comment of Applicants' to chinese office action No. 201880028737 issued Feb. 17, 2023.

Yao Z et al., "Synthesis of differently sized silver nanoparticles on a screen-printed electrode sensitized with a nanocomposites consisting of a reduced graphene oxide and cerium (IV) oxide for nonenzymatic sensing of hydrogen peroxide", Microchim Acta (2016) 183:2799-2806.

Zanardi C et al., "Development of an electrochemical sensor for NADH determination based on a caffeic acid redox mediator supported on carbon black", Chemosensors 2015, 3, 118-128.

Office Action issued Dec. 5, 2022 in connection with counterpart Japanese application 2019-559331, in English and in Japanese.

Notice of Opposition issued Aug. 25, 2025 in connection with counterpart European Patent Application No. 18724498.3.

* cited by examiner

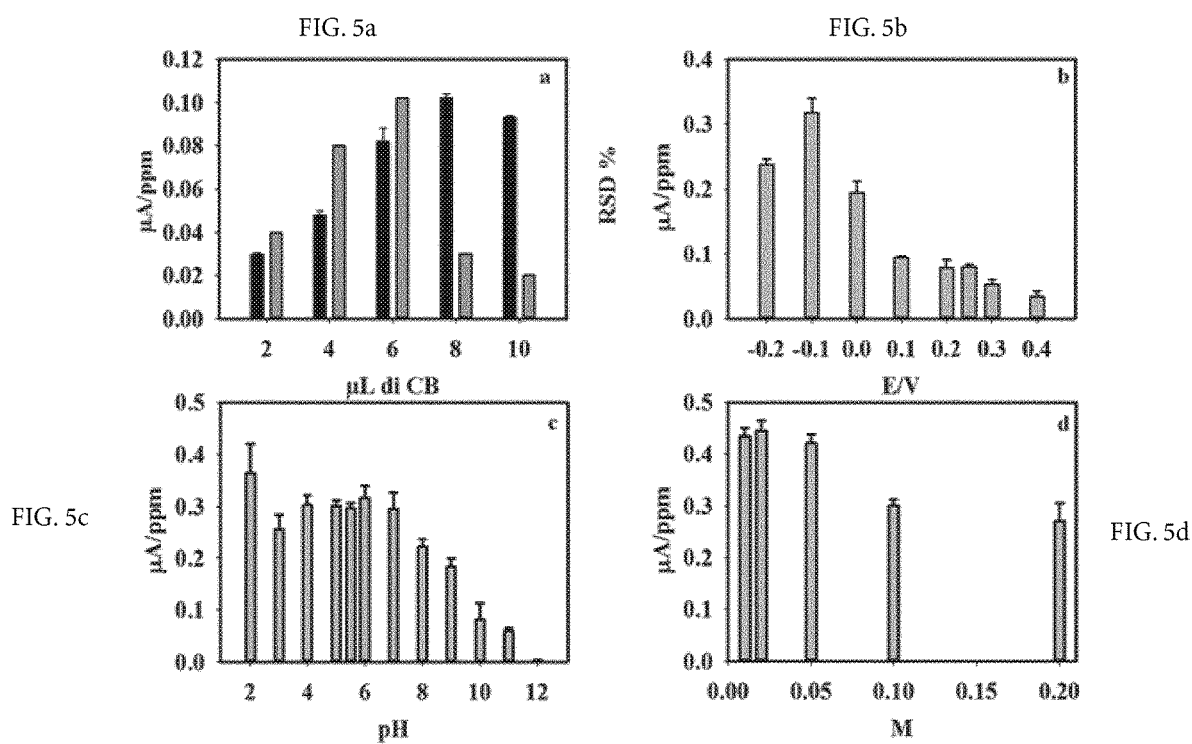

FIG. 11a
FIG. 11b
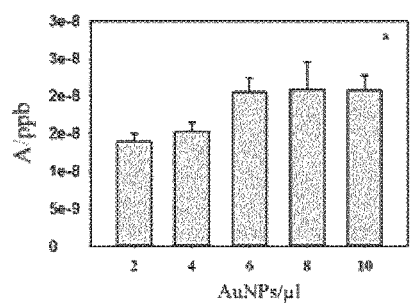
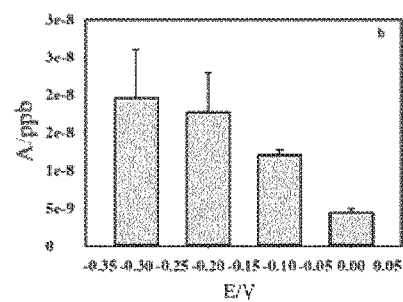
FIG. 11c
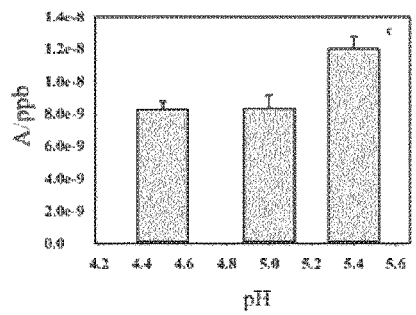
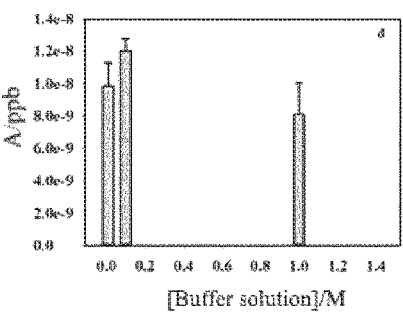
FIG. 11d
FIG. 12
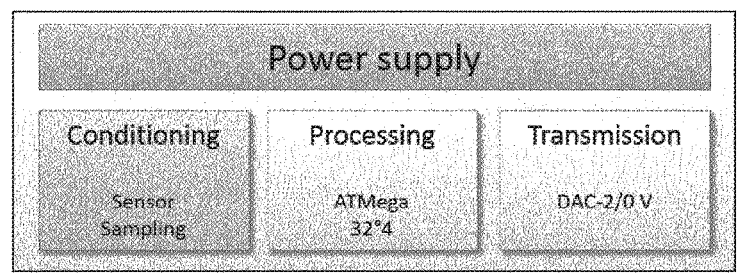

NANO- AND/OR MICRO-STRUCTURED PRINTED ELECTRODES

This utility application is a Continuation of U.S. Ser. No. 16/609,306 filed Oct. 29, 2019, which is a U.S. national stage of PCT/EP2018/061383 filed on 3 May 2018, which claims priority to and the benefit of Italian Application No. 102017000046831 filed on 3 May 2017, the contents of which are all incorporated herein by reference in their entireties.

FIELD OF THE INVENTION

The present invention relates to new electrochemical sensors and probes comprising one or more of said sensors, useful for the measure in a fluid of an analyte selected from the group consisting of: free chlorine, chlorine dioxide, total chlorine and peracetic acid; characterized in that said sensor includes at least a printed electrode nano- or micro-structured with a nano- or micromaterial selected from the group consisting of: nano- or microparticles of carbon black and/or nano- or microparticles of a metal selected from the group consisting of gold, silver, platinum, copper and combinations or alloys thereof; useful for monitoring water pollution and/or compounds useful for disinfecting water for domestic or industrial use, or water for swimming pools.

The present invention also relates a kit of an integrated system for the management of the sensors of the invention, and the use of such integrated system or kit for monitoring water pollution and/or compounds useful for the disinfection of domestic, industrial and swimming pool water.

BACKGROUND OF THE INVENTION

The drinking water biological pollutants represent still today the compounds responsible for acute infectious diseases.

Therefore it is necessary to carryout a disinfection treatment of waters destined to human consumption.

Chlorine dioxide was initially used as whitener in paper industry; since the 1950s it has also been employed as disinfectant and algaecide. The disinfectant properties of chlorine dioxide remain unaltered over a wide pH range and this product does not significantly alter the organoleptic characteristics of the water in which it is added.

"Free chlorine" is defined as the sum of the concentrations of the hypochlorite ion and of the hypochlorous acid, which both are produced by the reaction of hydrolysis of sodium hypochlorite, gaseous chlorine, calcium hypochlorite and isocyanuric acid derivatives (sodium dichloroisocyanurate and trichloroisocyanuric acid).

"Total chlorine" is defined as the sum of inorganic free chlorine and organic/inorganic combined chlorine. When nitrates of organic origin and/or ammonia compounds are present in water, inorganic chlorine reacts forming chloramines and its presence constitutes the combined chlorine. Combined chlorine can be classified in combined inorganic chlorine, derived from the reaction with ammonia, and in combined organic chlorine, obtained from the reaction between chlorine and nitrogen compounds, such as amino acids.

Peracetic acid is a liquid organic compound with a characteristic pungent odor, mainly employed as disinfectant in food, cosmetics and pharmaceuticals industries.

Its use for the treatments of large plant surfaces has certainly generated a considerable interest, thanks to its capability to easily solve some management problems, such as the bacteria abatement in short times at room temperature, and the absence of by-products harmful to human health.

However, peracetic acid also presents negative aspects concerning its instability, though it definitely remains one of the most used disinfection products on industrial scale. Actually, peracetic acid solution is available on market with different concentrations; those at 5% and 15% w/w are the most used.

To evaluate whether the concentration of disinfectants can be sufficient to guarantee an adequate disinfection, and at the same time not excessively high to produce reaction by-products harmful to humans in treated water, the concentration of such disinfectants must be monitored.

To date many instruments for the determination of free chlorine, which use the calorimetric or electrochemical detection, are available on the market.

In particular, the electrochemical probes present on the market are constituted from classical gold electrodes coupled to Ag/AgX reference electrodes, X=halide. These sensors present several disadvantages. First, they are very expensive because bulk gold is used to realize the working electrode. Furthermore, there is the need to clean the surface of the working electrode after some measures.

In literature, different studies have been reported with the purpose of developing electrochemical sensors for the determination of free chlorine. For example, in *Analytica Chimica Acta* (2005), 537: 293-298, platinum, gold and glassy carbon electrodes performances were compared, achieving a detection limit (LOD) of 1 ppm by using a platinum electrode. These kinds of electrodes have the disadvantage of undergoing a passivation process of the electrode surface in the presence of high concentrations of free chlorine. Furthermore, the sensor configuration does not allow an easy miniaturization (*Analytica Chimica Acta* (2005), 537: 293-298). In order to develop miniaturized electrodes, in *Talanta* [(2016), 146: 410-416], screen-printed carbon sensors, requiring the electrodeposition of Prussian Blue are described, thus making difficult an easy mass production of the sensors themselves.

With reference to free chlorine, the Italian Institute of Health establishes that spectrophotometric detection is the reference method for free chlorine determination. Chlorine, in fact, oxidizing a solution of N,N-diethyl-p-phenylenediamine (DPD), leads to the production of the Wurster compound, whose absorbance at 510 nm is related to the concentration of free chlorine in the sample.

However, high concentrations of the analyte produce a colorless and unstable imine formation, which causes a linearity loss of the calibration curve above 1 ppm of oxidant. Furthermore, this method allows the determination of the analyte in a range of 0.05-4 ppm (*Current Technology of Chlorine Analysis for Water and Wastewater* (2002) 17: 2-11; Ottaviani M, Bonadonna L. (Ed.). *Metodi analitici di riferimento per le acque destinate al consumo urnano ai sensi del DL. Vo 31/2001. Metodi chimici. Roma: Istituto Superiore di Sanità:* 2007. (Rapporti ISTISAN 07/31).

*Electrochemistry Communications* 47 (2014) 63-66 describes an electrode for measuring hydrogen peroxide, in which the printed electrode is functionalised with carbon black and nanoparticles of Prussian blue.

U.S. Pat. No. 6,627,058 refers to an electrode for measuring glucose, in which the printed electrode is functionalised with carbon black and nanoparticles of Prussian blue.

*Microchim Acta* (2016); Vol 183; #10; 2799-2806 reports an electrode for measuring hydrogen peroxide in which on the printed electrode are present silver nanoparticles, and said electrode is functionalized by using reduced graphene and cerium IV.

US 2014/083864A1 mentions a sensor useful for measuring, among the others, chlorine or peracetic acid, in which the printed electrode is covered with an ink containing conductive metal particles. In this patent application it is never mentioned nor suggested the use of nano- or micro-structured metallic particles, which would have increased the characteristics of the electrode.

DE 4319002 describes a sensor for the measurement of peracetic acid, in which on the printed electrode platinum microparticles may be present.

In recent years, research in the field of sensors has been focused on the production of screen-printed electrodes modified with nano- and/or micromaterials (nano- and microsensors). Among the technologies used for the production of screen-printed, screen printing technique is the most suitable technique for mass production of screen-printed electrodes with reduced costs.

In many scientific publications, sensors based on the use of screen-printed electrodes using screen printing technique, also modified with nanomaterials for the measurement of different analytes in different matrices are described (*Microchimica Acta* (2015) 182: 643-651; *Electroanalysis* (2014) 26: 931-939, *Electroanalysis* (2015) 27: 2230-2238; *Microchemistry Acta* (2016) 183: 2063-2083).

It is known in the state of the art that the production of stable dispersions of carbon nanotubes, for "sensors" preparation, requires the use of strong acids such as nitric acid and strongly oxidizing substances such as the permanganate, which generate products that require proper disposal.

To date in the field of water quality control there is still a strong perceived need to have available a system for monitoring free chlorine, total chlorine, chlorine dioxide, and peracetic acid that:
- is integrated into a miniaturized system;
- is low-cost;
- is suitable for in situ application;
- is easy to use even by unskilled person;
- during the production processes does not require the use of strong acids and/or agents strongly oxidizing that generate highly polluting products that must be properly disposed.

DESCRIPTION OF THE INVENTION

It is therefore an object of the present invention a printed electrode, nano- and/or micro-structured, for the measure, in fluids, of an analyte selected from the group consisting of: chlorine dioxide, free chlorine, total chlorine and peracetic acid, characterized in that it is prepared by using nano- or microparticles of carbon black and/or nano- or microparticles of a metal selected from the group consisting of gold, silver, platinum, copper and combinations or alloys thereof.

It is a further object of the invention an electrochemical sensor comprising at least one printed electrode as defined before. In particular, such sensor comprises
- at least an "printed electrodes group", in which said "printed electrodes group" comprises at least a working electrode; at least a reference electrode; and at least an auxiliary electrode;
- and is characterized in that:
  - the working electrode is functionalised/activated/prepared using nano- or microparticles of carbon black; and/or nano- or microparticles of a metal selected from the group consisting of gold, silver, platinum, copper and combinations or alloys thereof, preferably gold having an average diameter of 1 μm, in which the amount of the nano- or microparticles of carbon black, and/or metallic particles deposed on the working electrode is from 0.1 to 50 μl, preferably from 1 to 20 μl, more preferably is from 2 to 10 μl, and in which the deposition (on the working electrode) is made by consecutive applications of 2 μl each.

According to the invention, the reference electrode and the counter electrode may be located on the other side of the printed electrode, i.e. exposed to the reservoir (in other words, different electrode in different side of the printed electrode).

It is a further object of the present invention an electrochemical sensor nano- and/or micro-structured;
- comprising at least an "printed electrodes group" containing at least a working electrode; at least a reference electrode; and at least an auxiliary electrode; preferably said printed electrodes group is further characterized in that it comprises at least one hole (21) that allow the gel contained in the reservoir (12) to pass through and to act as contacting electrolyte (see FIG. 1*d*).

Preferably, the working electrode is activated/prepared with metal microparticles selected from the group consisting of gold, silver, platinum, copper and combinations or alloys thereof, having an average diameter of from 20 to 0.05 μm; preferably from 10 to 0.3 μm; more preferably (about) 1 μm; and the auxiliary electrode is prepared, during the process of printing, using an ink containing a carbon based material, preferably graphite;

or, the working electrode (belonging to the "printed electrodes group") at the end of the printing process as described, for example, in *Analytica Chimica Acta* 707 (2011):171— 177; is functionalised by "drop-casting" as described, for example, in *Electroanalysis* 24 (2012) 743-751;

by using:

nanomaterials selected from the group consisting of carbon black or metallic nanomaterials selected from the group consisting of gold, silver, platinum, copper and combinations or alloys thereof; preferred are nanoparticles of gold, obtained, for example, as described in *Sensors and Actuators B* (2015) 212:535-543;

in which the amount of nano- or microparticles of carbon black, or metallic particles deposed on the working electrode is from 0.1 to 50 μl; preferably from 1 to 20 μl; more preferably from 2 to 14 μl;

and in which the deposition is carried out in consecutive applications of 2 μl each.

The printed electrodes obtained by drop-casting, with the process above described are further characterized in that:
- the measure of free chlorine is made applying to the electrodes a potential from −0.2 to +0.4 V; preferably from −0.2 to +0.1 V; most preferably −0.1 V vs Ag/AgCl;
- the measure of chlorine dioxide is made applying to the electrodes a potential from +0.02 to +1 V; preferably from +0.01 to +0.5 V; most preferably +0.1 V vs Ag/AgCl;
- the measure of total chlorine is made applying to the electrodes a potential from 0 to +1 V; preferably from +0.2 to +0.8 V, most preferably from +0.3 to +0.6 V vs, Ag/AgX;

the measure of peracetic acid is made applying to the electrodes a potential from −0.3 to 0 V; preferably from −0.1 to 0 V; most preferably −0.1 V vs Ag/AgCl;

while the probes or sensors obtained by using the ink containing metal microparticles, according to the process above described, are characterized in that:

the measure of free chlorine is made applying to the electrodes a potential from 0 to +1 V; preferably from +0.2 to +0.8 V; most preferably +0.5 V vs Ag/AgX;

the measure of chlorine dioxide is made applying to the electrodes a potential from 0 to +1 V; preferably from +0.2 to +0.8 V; most preferably from +0.3 to +0.5 V vs Ag/AgX;

the measure of total chlorine is made applying to the electrodes a potential from 0 to +1 V; preferably from +0.2 to +0.8 V, most preferably from +0.3 to +0.6 V vs. Ag/AgX;

the measure of peracetic acid is made applying to the electrodes a potential −0.5 to 0 V; preferably from −0.3 to 0 V; most preferably −0.2 V vs Ag/AgCl.

It is a further object of the present invention a probe comprising one or more electrochemical sensor above described.

It is a further object of the present invention is a method for preparing an electrochemical sensor nano- and/or micro-structured; comprising:

at least an "printed electrodes group" containing at least a working electrode; at least a reference electrode; and at least an auxiliary electrode; in which, preferably, said printed electrodes group is characterized in that it comprises at least one hole (21) that allow the gel contained in the reservoir (12) to pass through and to act as contacting electrolyte (see FIG. 1d).

Preferably, the working electrode and the reference electrode are prepared, during the process of printing, using an ink containing a metal microparticles selected from the group consisting of gold, silver, platinum, copper and combinations or alloys thereof, having an average diameter of from 20 to 0.05 μm; preferably from 10 to 0.3 μm; more preferably (about) 1 μm.

and the auxiliary electrode is prepared, during the process of printing, using an ink containing a carbon based material; preferred is graphite;

or (alternatively):

the working electrode (belonging to the "printed electrodes group") at the end of the printing process is functionalised by "drop-casting" by using:

nanomaterials selected from the group consisting of carbon black or metallic nanomaterials selected from the group consisting of gold, silver, platinum, copper and combinations or alloys thereof; preferred are nanoparticles of gold, obtained, for example, as described in *Sensors and Actuators B* (2015) 212: 536-543;

in which the amount of nano- or microparticles of carbon black, or metallic particles deposed on the working electrode is from 0.1 to 50 μl; preferably from 1 to 20 μl; more preferably from 2 to 14 μl;

and in which the deposition is carried out in consecutive applications of 2 μl each.

The printed electrodes obtained by drop-casting, with the process above described are further characterized in that:

the measure of free chlorine is made applying to the electrodes a potential from −0.2 to +0.4 V; preferably from −0.2 to +0.1 V; most preferably −0.1 V vs Ag/AgCl;

the measure of chlorine dioxide is made applying to the electrodes a potential +0.2 to +1 V; preferably from +0.01 to +0.5 V; most preferably +0.1 V vs Ag/AgCl;

the measure of total chlorine is made applying to the electrodes a potential from 0 to +1 V; preferably from +0.2 to +0.8 V, most preferably from +0.3 to +0.6 V vs. Ag/AgX;

the measure of peracetic acid is made applying to the electrodes a potential from −0.3 to 0 V; preferably from −0.1 to 0 V; most preferably −0.1 V vs Ag/AgCl;

while the probes or sensors obtained by using the ink containing metal microparticles, according to the process above described, are characterized in that:

the measure of free chlorine is made applying to the electrodes a potential from 0 to +1 V; preferably from +0.2 to +0.8 V; most preferably +0.5 V vs Ag/AgX;

the measure of chlorine dioxide is made applying to the electrodes a potential from 0 to +1 V; preferably from +0.2 to +0.8 V; most preferably from +0.3 to +0.5 V vs Ag/AgX;

the measure of total chlorine is made applying to the electrodes a potential from 0 to +1 V; preferably from +0.2 to +0.8 V, most preferably from +0.3 to +0.6 V vs. Ag/AgX;

the measure of peracetic acid is made applying to the electrodes a potential from −0.5 to 0 V; preferably from −0.3 to 0 V; most preferably −0.2 V vs Ag/AgCl.

Another object of the invention is a kit comprising at least an electrochemical probe as described before and further comprising:

at least a probe holder;
at least a capsule;
at least an electrolytic solution or gel;
at least an hydrophobic and/or hydrophilic membrane; and
at least an electronic control, implementation and/or data transfer.

Such a kit is useful to make for continuous measurements in a way that a skilled in the art knows very well.

According to the present invention, the sensor comprises a printed electrode, as defined before, and preferably it consists of a working electrode, a reference electrode, a counter electrode and an electronic device that has the task to configure the electrodes group and to acquire and decode the current signal coming from the electrode group, in which the output signal can be a signal in voltage and/or current and/or digital and/or LAN and/or radio frequency connection.

The sensor according to the invention is suitable for being used for single analytical determinations (see FIG. 1a) or to be inserted in line for continuous monitoring of the analytes (see FIGS. 1b and 1c).

the printed electrodes group (1);
the measurement display (2);
the central body of the device (3);
the container of the liquid to be analyzed (4).

Figure 1A:
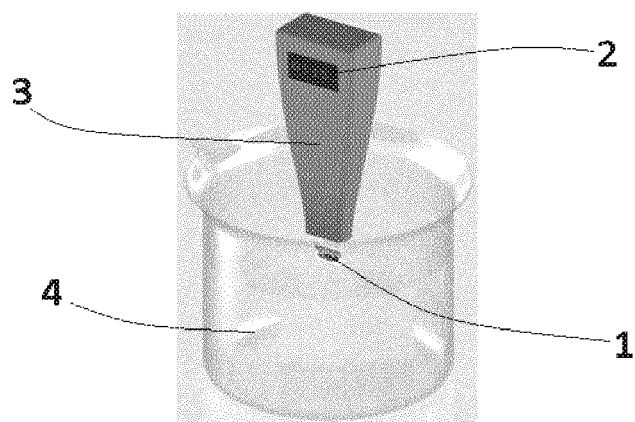
In FIG. 1a it is shown the probe according to the present invention, useful for a single detection of tan analyte, comprising.
Figure 1B:
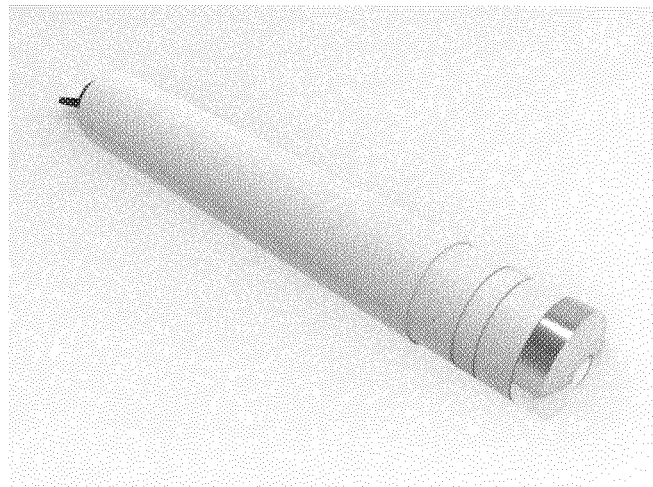

In FIG. 1b the probe according to the invention is presented, for a continuous detection of the analyte under examination.

Figure 1C:
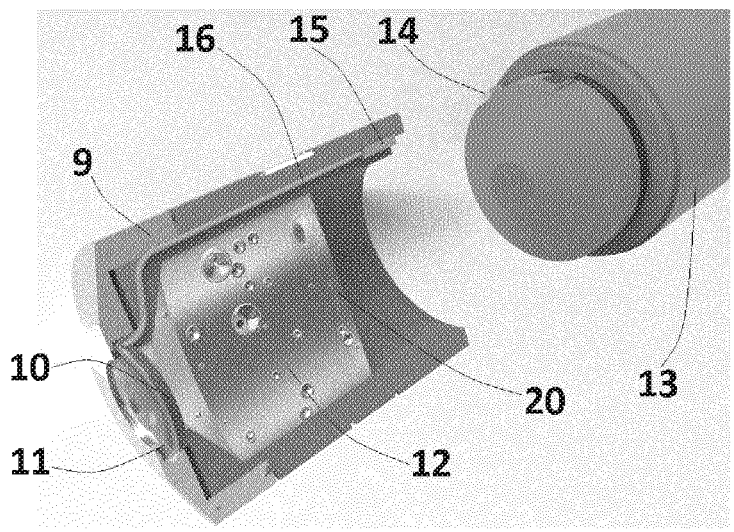

FIG. 1c shows a sectional detail of the probe according to the invention, for a continuous detection of the analyte under examination, comprising:

- a capsule supporting structure (9);
- a printed sensor (working electrode or reference electrode or auxiliary electrode) (10);
- a hydrophobic or hydrophilic membrane (11);
- an electrolyte gel solution (12);
- a sensor body (13), containing the electronic management or system of the sensor;
- contacts (14) for connection to the capsule;
- contacts (15) for connection to the sensor body (13);
- a connection cable of the screen-printed electrode (16) (in total the connection cables are three, one for each electrode);
- a separating septum (20).

Figure 1D:
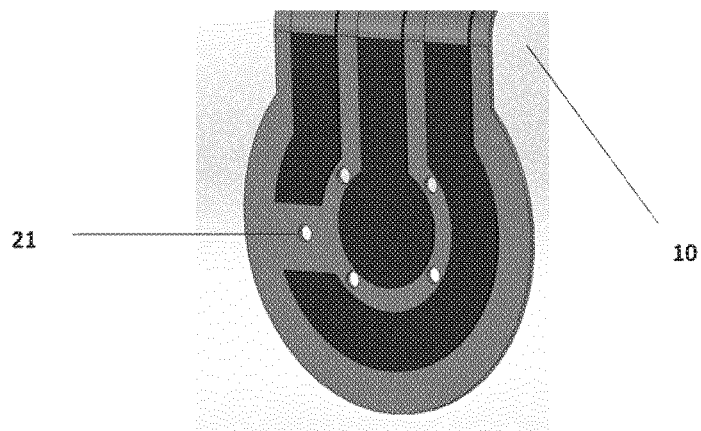

FIG. 1d shows the printed sensor (working electrode/reference electrode/auxiliary electrode) (10), in which some holes (21) are present, that allow the gel contained in the reservoir (12) to pass through and to act as contacting electrolyte.

Figure 1E:
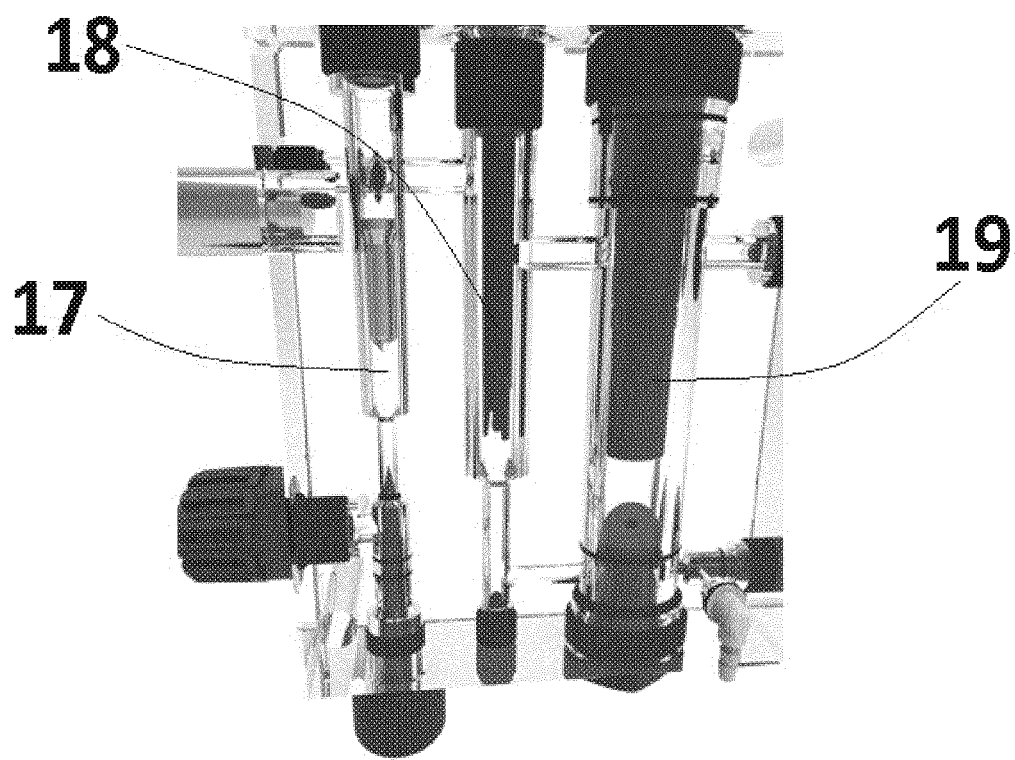

FIG. 1e shows an example of a probe holder useful to contain at east one probe object of the present invention, in which:

- (17) represents a flow meter (for the control of flow parameters);
- (18) represents the pH probe or electrode known in the art; and
- (19) represents the probe or electrode according to the present invention.

It is evident to the expert of the art that a probe holder may consist of a single module (19), if a flow parameter control is carried out upstream; otherwise it may consist of module (17) and (19); or of module (17), (19) and at least a further module in which to insert one or more probes for further measurement of analyte.

Figure 2A:
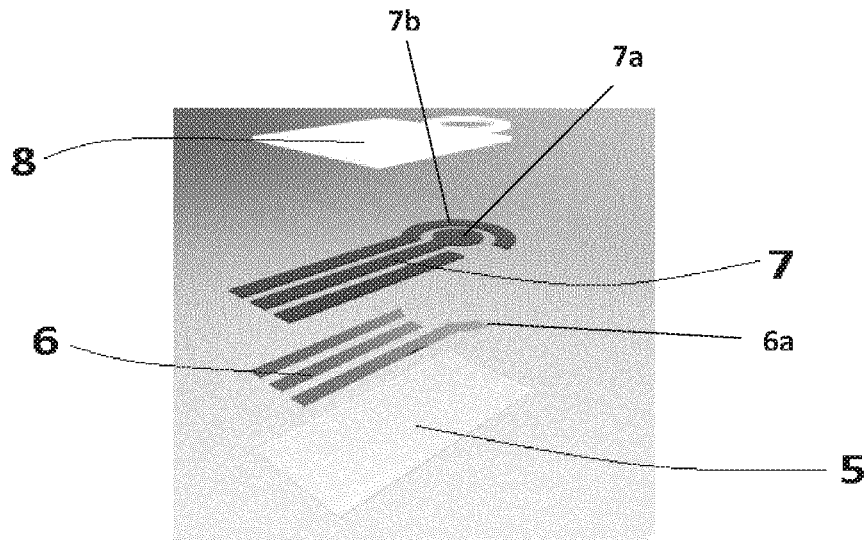
Figure 2B:
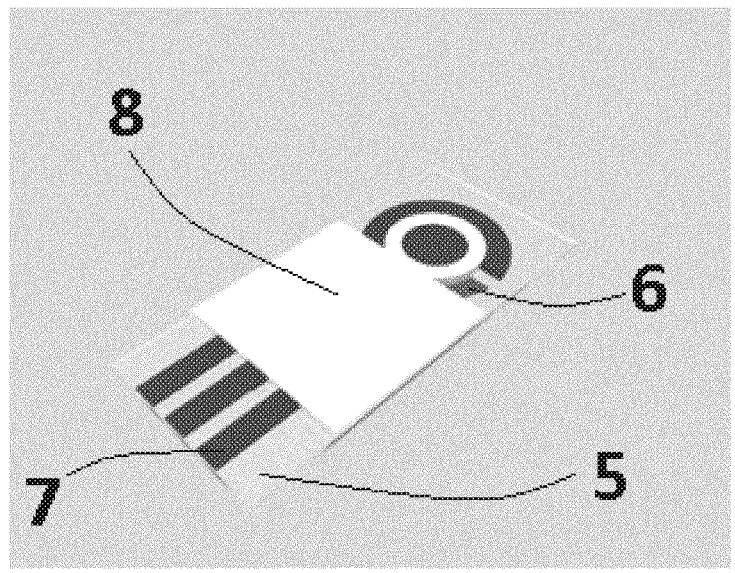

FIGS. 2a and 2b show the printed electrodes group (1), both disassembled (FIG. 2a) and assembled (FIG. 2b) comprising:

- a flexible substrate or support (5), on which the electrode is printed;
- three metal conductive tracks 6), one of which at its end constitutes the reference electrode (6a);
- three graphite tracks (7) (and/or other suitable material, known in the art), one of which at its end is nano- or micro-structured according to the invention and constitutes the working electrode (7a) and another one of which at its end constitutes the auxiliary electrode (7b); and
- an insulating layer (8).

Figure 3A:
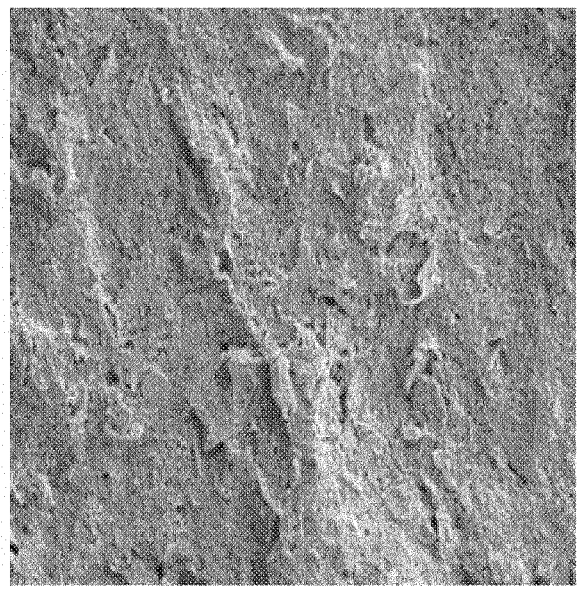
Figure 3B:
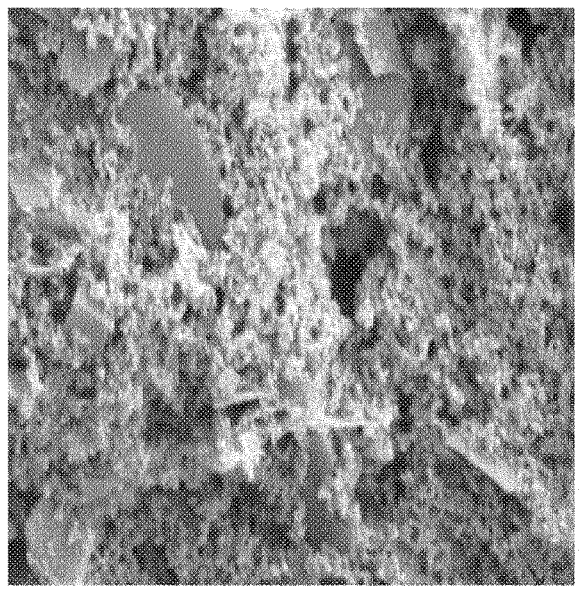
Figure 3C:
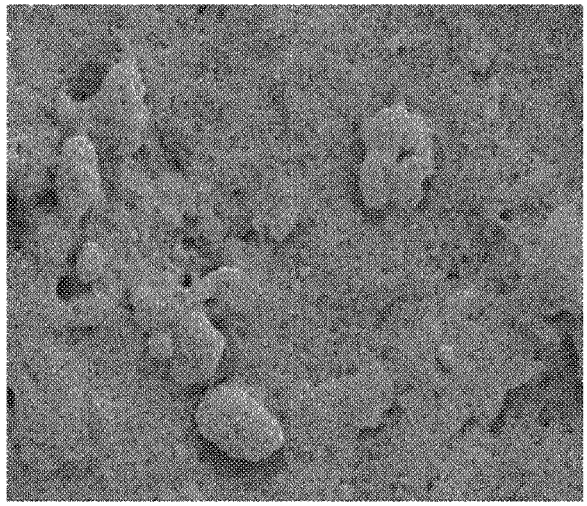
Figure 3D:
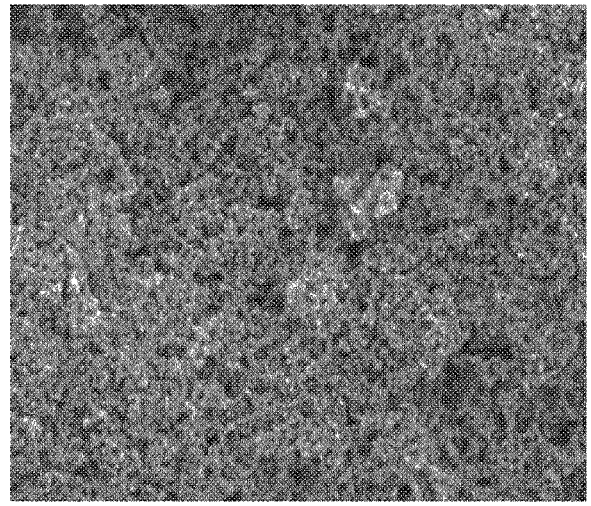

Figures obtained by electron microscopy of the printed electrodes, before (FIGS. 3a and 3b) and after (FIGS. 3c and 3d) the modification by drop-casting with the dispersion of Carbon Black (CB), are shown. In FIGS. 3c and 3d the deposition of CB nanoparticles that completely cover the working electrode surface is clearly evidenced.

Figure 4:

FIG. 4 shows the control and/or actuation unit (known in art) which has the function of collecting data detected by the various peripheral probes and to activate the dosing pumps for modifying this data, if any. The control of these parameters (free chlorine, chlorine dioxide, total chlorine, peracetic acid and/or pH) can be made manually or automatically, locally or using a remote control of the parameters.

The presence of a display, optionally touchscreen, locally or in remote, improves the management of the "system".

FIGS. 5a, 5b, 5c and 5d report:

- the trend in amperometric responses of electrodes modified with 2, 4, 6, 8 and 10 μl of CB (2 μl for n times) at a fixed potential of 0.25 V vs Ag/AgCl for sodium hypochlorite (free chlorine) concentrations ranging from 0.1 to 10 60 ppm (FIG. 5a). The sensitivity (black bars) and the RSD % (gray bars) are reported in FIG. 5a. Increasing the amount of CB nanoparticles deposited on the working electrode, an increase in the amperometric response has been observed. A volume of CB of 10 μl has been chosen, as this value allowed obtaining the best result in terms of repeatability, signal stability and sensitivity.
- the trend in the amperometric responses by varying the range of potential from −0.2 V to 0.4 V vs Ag/AgCl (FIG. 5b). The best result in terms of sensitivity was obtained by applying a potential of −0.1 V vs Ag/AgCl with an RSD % inter-electrode equal to 6%;
- the trend in the amperometric responses by varying pH in a range between 2 and 12 (FIG. 5c). pH-value 5 permitted to obtain a sensitive and accurate measurement;
- the trend in the amperometric responses following ionic strength changes (FIG. 5d). A Britton-Robinson buffer 0.02 M+KCl 0.02 M resulted the best solution to be used.

Figure 6A:
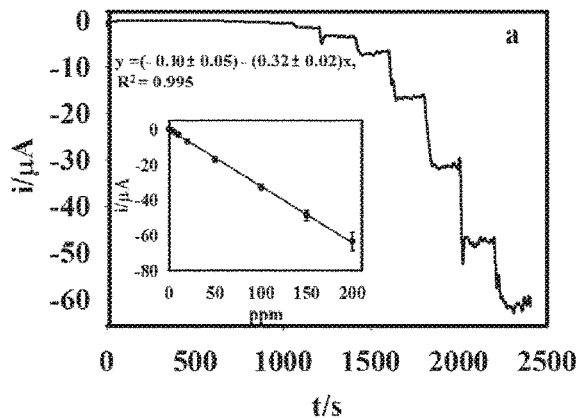
Figure 6B:
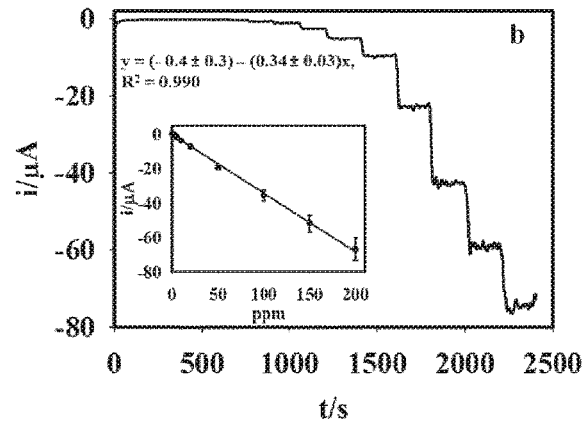

FIGS. 6a and 6b show the data obtained (amperometric curve with relative equation and calibration curve-insert) related to the inter-electrode (FIG. 6a) and intra-electrode (FIG. 6b) repeatability.

In particular, the measurements carried out using same electrode or different electrodes gave the similar response, demonstrating the repeatability of the system.

The calibration curve was obtained by reporting the mean value (n=3) of current recorded in function of the hypochlorite concentration in Britton Robinson buffer solution 0.02 M+KCl 0.02 M pH=5, applying during amperometric tests a potential of −0.1 V.

From the results obtained, excellent inter-electrode and intra-electrode repeatability was observed; the same sensor was able to detect a chlorine concentration range between 0.05 and 200 ppm.

Figure 7:
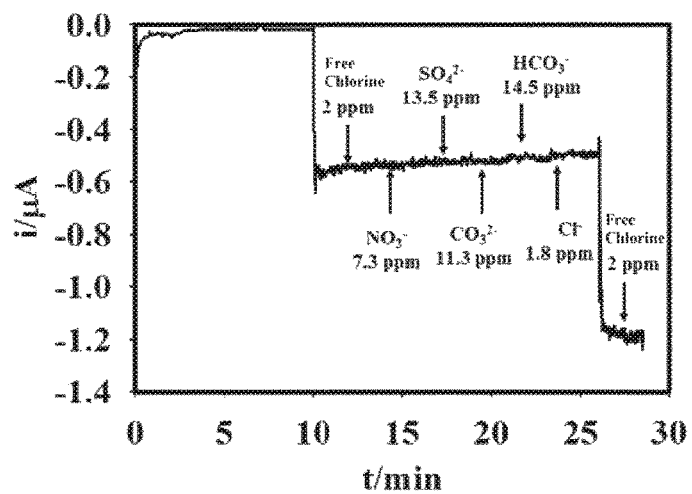

FIG. 7 shows the results obtained in the interference study by evaluating possible interfering ionic species ($NO_3^-$, $SO_4^{2-}$, $CO_3^{2-}$, $HCO_3^-$ and $Cl^-$ ions), These ions may be present in swimming pool water during maintenance treatments. The results obtained show that the presence of the ions did not modify the sensor response compared to the analyte and, above all, the sensor(s) did not show an electrochemistry response against them.

Figure 8A:
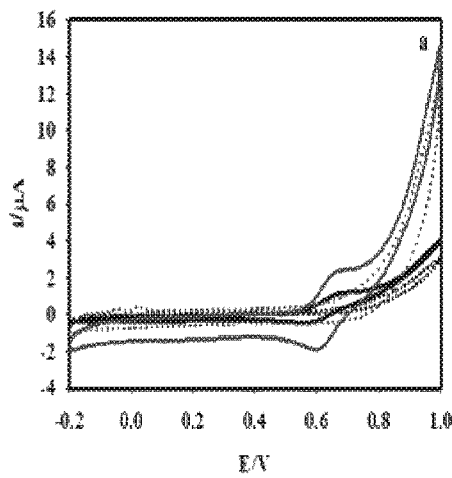
Figure 8B:
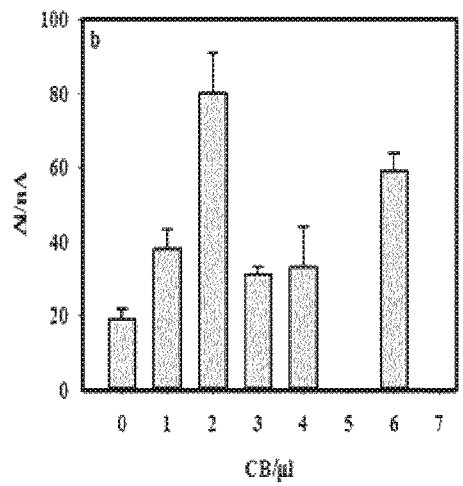

In FIGS. 8a and 8b results obtained for the chlorine dioxide sensor are reported; in details, the voltammetric study in B.R. 0.02 M+KCl 0.02 M, pH=2 in the absence (dashed line) and in the presence (continuous line) of analyte with unmodified sensor (black line) and modified with CB (gray line) (FIG. 8a); in this case the standard solution of chlorine dioxide was prepared using the reagent h.

FIG. 8b reports the results obtained from the amperometric study carried out by applying a potential of 0 V vs AgCl and using a sensor modified with various amounts of CB (FIG. 8b).

Figure 9A:
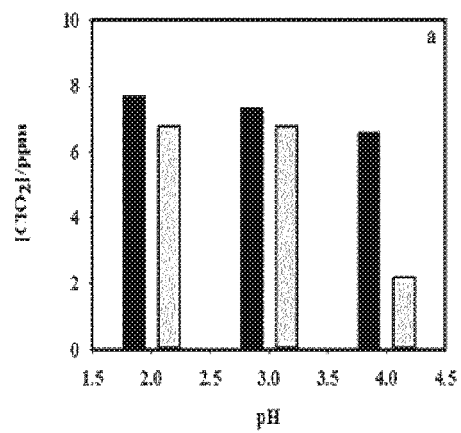
Figure 9B:
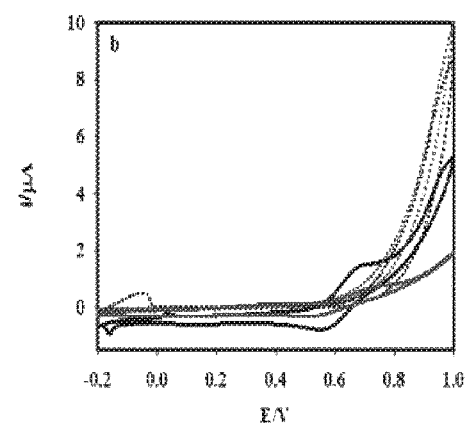

In FIGS. 9a and 9b, data obtained from the study of dioxide chlorine concentration as a function of pH in buffer B.R 0.02 M+KCl 0.02 M by spectrophotometric analysis (black bars, instant concentration, gray bars, after 24 h) (FIG. 9a) are showed.

In FIG. 9b the cyclic voltammetry study to confirm the data spectrophotometrically obtained in B.R. 0.02 M+KCl 0.02 M is shown, in the absence (dashed line) and in the presence of analyte (solid line) at pH 4 (gray line) and pH=2 (black line).

Figure 10:
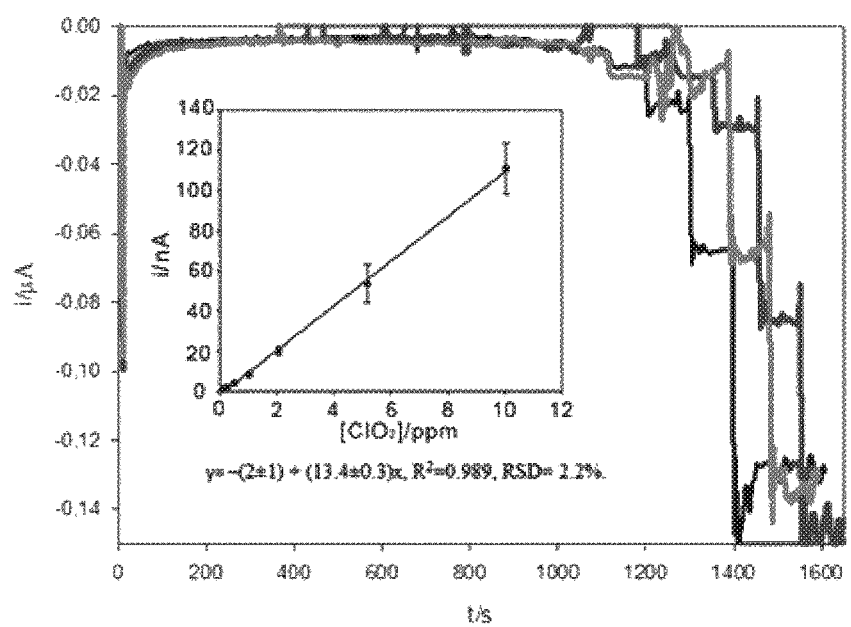

In FIG. 10, the inter-electrode amperometric study for the measurement of chlorine dioxide obtained with three different electrodes (light gray, dark gray and black amperogramms showed the response for each different electrode) is reported, by applying a potential of 0.1 V vs Ag/AgCl in Britton-Robinson buffer 0.02 M+KCl 0.02 M pH=2. Insert: calibration line obtained as an average of the currents obtained from three different electrodes as a function of the concentration of the analyte (0.1-10 ppm); using "the reagent h" for preparing the standard solution of chlorine dioxide.

In FIGS. 11a, 11b, 11c and 11d results obtained from amperometric studies by the sensor for the measurement of peracetic acid, conducted for the choice of operating parameters, are reported:

optimization of the amount of gold nanoparticles deposited on the working surface in 0.1 M acetate buffer, pH=5.4 and E=−0.1 V, optimization of the potential applied with 6 μL gold nanoparticles in 0.1 M acetate buffer and pH=5.4, pH optimization with 6 μL gold nanoparticles in buffer acetate 0.1 M and E=−0.1 V, optimization of the ionic strength of the working solution with 6 μl of gold nanoparticles in acetate buffer pH=5.4 and E=−0.1.

FIG. 12 shows a block diagram of the system in which the sensor was optimized and integrated with a potentiostat, developed to allow an automatic measurement of free chlorine. Inside the probe a block that provided for conditioning, processing and transmitting data coming from the electrodes using electrical diagrams and software well known in the art was present.

Figure 13:
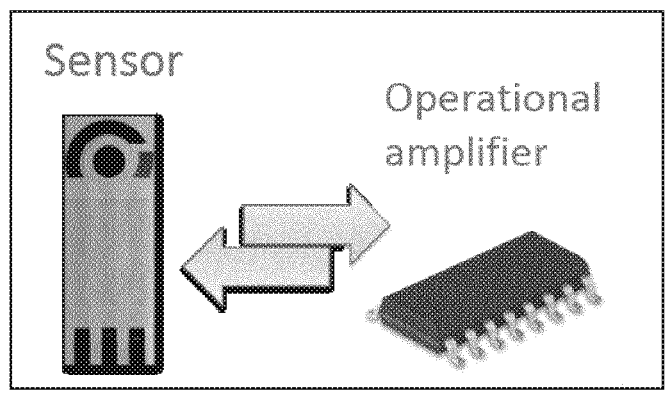

FIG. 13 shows the communication system between the sensor and the operational amplifier. In fact, the signal conditioning system provided the use of operational amplifiers to keep the voltage constant and to measure the current.

The operational amplifier was able to decouple the control system of the microcontroller from the measurement system.

Figure 14:
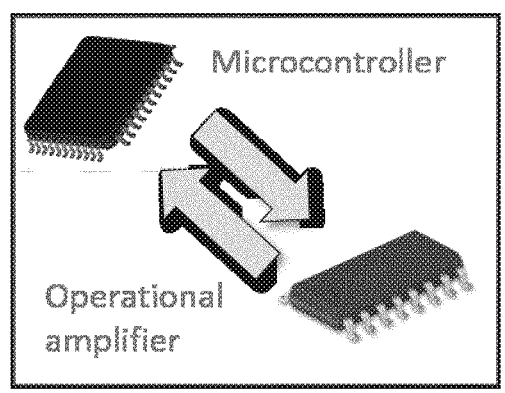

FIG. 14 shows the communication system between microcontroller and operational amplifier. The processing system provides a continuous data exchange between the microcontroller and the operational amplifiers through ADC and 12 bit DAC. The microcontroller, using the DAC, continuously provides the working voltage to be applied to the electrodes. The operational amplifier is used to transform the current coming from the electrodes. This current is changed into voltage and measured through the ADC present on the micro.

A signal is generated at the output of the electronic system, which in turn is sent to the control and/or to the implementation control unit. This signal is proportional to the measured analyte concentration.

The potentiostat circuit and the microcontroller that acquires the signal in current coming from the electrode assembly (well known in the art and easily replicable by a sector expert), constitute a system that allows the measurement of particular analyte concentrations; the device that manages the system logic is a microcontroller well known in the art.

Figure 15:
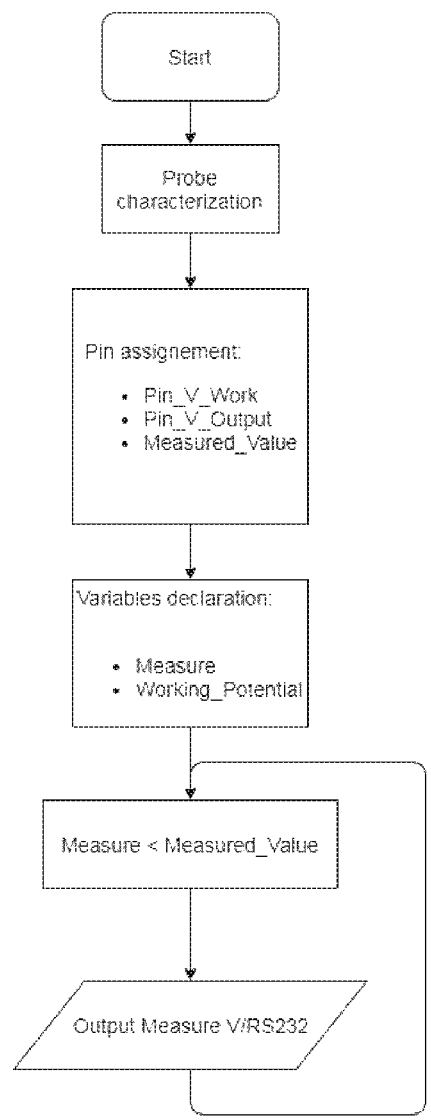

In FIG. 15, the operational algorithm of the program, easily written by a technician skilled in the art, is reported. The main program (see also FIG. 12) provides, after the Pin assignment, the variables declaration used within it, including the working voltage variable to which the electrodes are subjected. After setting the working voltage variable, the program will start measuring the current between the electrodes providing an input voltage to the microcontroller. The program also allows choosing the type of output signal.

The examples below illustrate the invention without limiting it.

Materials and Methods

Instruments
   Magnetic stirrer, Hanna instruments
   Digital pH-meter 334-B, Amel Instrument
   Analytical balance, Sartorius
   High performance multipurpose precision screen printer DEK 245, DEK, Weymouth, UK Sonicator Falc
   Portable potentiostat/galvanostat PalmSens Instrument, Eco Chemie, Utrecht, Olanda con software PSTrace 4.4

Reagents
   a) Graphite ink, Electrodag 423 SS
   b) Silver ink, Electrodag 477 SS
   c) Gold ink, Dupont BQ331
   d) Insulating ink, Gwent Group D2070423P5
   e) Insulating ink, Electrodag PF 455B
   f) Polyester substrate, Autostat HT5
   g) Gold nanoparticles, Stream Chemicals Ref. 79-0180.
   h) Chlorine dioxide release mixture Aldrich chemical Company, [7758-19-2]

EXAMPLE 1

Preparation Procedure for a Functionalized Sensor Useful for the Free Chlorine Measurement Using Drop-Casting Method For the preparation of the functionalized sensor for free chlorine measurement, as "starting product", a not functionalized sensor or electrode was used; the functionalization was carried out by depositing on the surface of the working electrode 10 μl (5 depositions of 2 μl each) of a dispersion of CB (Carbon Black N 220 from Cabot Ravenna Italy); the dispersion was prepared by placing 1 mg of CB in 1 ml of a water and dimethylformamide solution (1:1); before use, this dispersion was sonicated for an hour at 59 KHz; with obtaining a functionalized electrode for the detection of free chlorine.

The liquid to be analyzed (for the detection of free chlorine), before reading, was placed in a working solution, consisting of a Britton-Robinson buffer+KCl at pH 5, with an ionic strength of 0.02 M Britton-Robinson and 0.02 M for the KCl. For the measure a potential of −0.1 V vs Ag/AgCl was applied.

The free chlorine electrode according to the invention was characterized by the analytical point of view to determine the linear range, sensitivity and inter- and intra-electrode repeatability. The calibration curve was obtained by reporting the mean value (n=3) of current recorded as a function of free chlorine concentration in Britton Robinson buffer solution 0.02 M+KCl 0.02 M pH=5, applying, during the amperometric tests, a potential of −0.1 V, obtaining a sensitivity of 0.32±0.02 μA/ppm and RSD %=6%. The results obtained show an excellent inter-(FIG. 6a) and intra electrode repeatability (FIG. 6b); the sensor according to the invention was able to detect a free chlorine concentration range between 0.05 and 200 ppm.

A similar response was also observed using trichloroisocyanuric acid as standard: 0.36±0.01 µA/ppm and RSD %=3%.

The limit of detection (LOD) of the sensor according to the invention, calculated as S/N=3, was equal to 0.01 ppm and the LOQ=0.03 ppm obtained from S/N=10.

EXAMPLE 2

Preparation Procedure for a Functionalized Sensor Useful for the Free Chlorine Measurement, Where the Working Electrode and the Reference Electrode are Prepared, During the Process of Printing, Using an Ink Containing a Metal (the Auxiliary Electrode is Prepared with Methods Known in the Art Using an Ink Containing Graphite)

For the preparation of the functionalized sensor for free chlorine measurement, the non-functionalized sensor or electrode was used as "starting product", for which an ink based on gold microparticles was used for working electrode.

For the measurement, an electrolyte solution consisting of a buffer system, preferably phosphate, borate, acetate, citrate, or mixtures thereof, was used, based on the field of application of the sensor, more preferably a buffer which maintains the pH value in a range from 2 to 12 is used, a supporting electrolyte preferably a halogenated salt in relation to the type of reference electrode of the sensor and to the analyte to be determined at a variable concentration more preferably between 1% and 15%; and if necessary.

For the measurement to the electrodes a potential of +0.5 V vs Ag/AgX was applied.

Using this electrode, we moved to the analytical characterization in order to determine the range/linearity interval and inter-electrode repeatability that were 0-20 ppm and 2%, respectively. Furthermore, the sensitivity turned out to be 400 nA/ppm.

EXAMPLE 3

Preparation Procedure for a Functionalized Sensor for the Measurement of Chlorine Dioxide Using Drop-Casting Method For the preparation of the functionalized sensor, as "starting product", a non functionalized the sensor was used; the functionalization was carried out using 2 µl of carbon black nanoparticles (prepared as described in Example 1) (FIG. 8).

For the measurement, a working solution consisting of Britton-Robinson buffer+KCl at pH 2 (FIG. 9) was used with an ionic strength of 0.02 M both for Britton-Robinson and for KCl (FIG. 9); applying to the electrodes a potential of +0.1 V vs Ag/AgCl.

The chlorine dioxide standard solution was prepared using the reagent h, chlorine dioxide release mixture.

Using the operating parameters described above, a functionalized electrode as obtained.

The chlorine dioxide electrode, according to the invention, was characterized by the analytical point of view to determine the linear range, sensitivity and inter- and intra-electrode repeatability. The calibration curve was obtained reporting the mean value (n=3) of current recorded as a function of the concentration of dioxide chlorine in Britton Robinson buffer solution 0.02 M+KCl 0.02 M, pH 2, applying during the amperometric tests a potential of +0.1 V with a sensitivity of 13.4±0.3 nA/ppm (FIG. 10).

From the obtained data, an excellent inter-(RSD %=2.2) intra (RSD %=2.7) electrode repeatability was observed; the sensor, according to the invention, was able to detect a chlorine dioxide concentration range between 0.1 and 10 ppm.

The limit of detection (LOD) of the sensor according to the invention, was equal to 0.03 ppm and the LOQ=0.1 ppm.

Finally, the sensor according to the invention also proved its validity in pool water. Because pool water is a complex matrix, it was necessary to dilute the sample and the dilution factor chosen, as a compromise between sensitivity and low matrix effect, it was equal to 1:5 v/v in buffer solution. The sensitivity obtained was 5.4±0.4 nA/ppm. The accuracy of the sensor was evaluated using the recovery method, obtaining a percentage recovery of 78±8%.

Alternatively, it is possible to synthesize the standard solution of chlorine dioxide using sodium chlorite and hydrochloric acid, the functionalized electrode, useful for the determination of chlorine dioxide, showed an improved sensitivity equal to 278±65 nA/ppm.

EXAMPLE 4

Preparation Procedure for a Functionalized Sensor for the Measurement of Chlorine Dioxide Where the Working Electrode and the Reference Electrode are Prepared, During the Process of Printing, Using an Ink Containing Metal For the preparation of the functionalized sensor for the measurement of chlorine dioxide, the non-functionalized sensor or electrode was used, as "starting product", for whose working electrode an ink based on gold microparticles was used.

For the measurement, an electrolyte solution, consisting of a buffer system, preferably phosphate, borate, acetate, citrate, or mixtures thereof, was used, based on the field of application of the sensor, more preferably a buffer is used which maintains the pH value in a range from 2 to 12, a supporting electrolyte preferably a halogenated salt in relation to the type of reference electrode of the sensor and to the analyte to be determined at a variable concentration more preferably between 1% and 15%; and if necessary.

For the measure a potential of +0.3 to +0.5 V vs Ag/AgX was applied.

The chlorine dioxide electrode according to the invention, was characterized by the analytical point of view to determine the linear range and inter electrode repeatability, obtaining a linear range up to 10 ppm with a good inter-electrode repeatability (RSD %=5%).

EXAMPLE 5

Preparation Procedure for a Functionalized Sensor for Measurement of Total Chlorine Using Drop-Casting Method For the preparation of the functionalized sensor for total chlorine measurement, as "starting product", the non-functionalized sensor was used; the functionalization was carried out using 6 µl of gold nanoparticles (reagent g).

For the measurement, an electrolyte solution consisting of a buffer system, preferably phosphate, borate, acetate, citrate, or mixtures thereof, was used, based on the field of application of the sensor, more preferably a buffer is used which maintains the pH value in a range between 2 and 8), a supporting electrolyte preferably a halogenated salt in relation to the type of reference electrode of the sensor and to the analyte to be determined at a variable concentration more preferably between 1% and 15%; and if necessary.

For the measure a potential of +03 to +0.6 V vs Ag/AgX was applied.

The total chlorine electrode according to the invention, was characterized by the analytical point of view to determine the linear range, and inter-electrode repeatability, obtaining a linear range up to 20 ppm with a good inter-electrode repeatability (RSD %=5%).

EXAMPLE 6

Preparation Procedure for a Functionalized Sensor for Measurement of Total Chlorine Where the Working Electrode and the Reference Electrode are Prepared, During the Process of Printing, Using an Ink Containing Metal The screen-printed electrode for the sensor useful for the measurement of total chlorine was functionalized during the printing process using ink based on gold microparticles with an average diameter of 1 μm (reagent c).

For the reading, an electrolytic solution or gel consisting of a buffer system, preferably phosphate, borate, acetate, citrate and mixture of them was used, chosen in accordance with the scope of the sensor, more preferably a buffer that can maintains the pH value in an inclusive range between 2 and 12, a supporting electrolyte preferably a halogenated salt in relation whit the type of reference electrode of the sensor and to the analyte to be determined at a variable concentration, more preferably between 1% and 15%; and if necessary, in accordance with the type of membrane used, a gelling agent chosen from the family of organic compounds of natural origin, miscible in water in percentage ranging from 85% to 100%.

For the reading, a potential of 0.3 to 0.6 vs Ag/AgX was applied to the electrodes.

The total chlorine electrode according to the invention, was characterized by the analytical point of view to determine the linear range, sensitivity and inter- and intra-electrode repeatability, obtaining a linear range up to 20 ppm with a good inter-electrode repeatability (RSD %=6%).

EXAMPLE 7

Preparation Procedure of a Functionalized Sensor Useful for the Measurement of Peracetic Add Using Drop-Casting Method For the preparation of the functionalized sensor for measuring the acid peracetic, as "starting product", the not functionalized sensor was used; the functionalization was carried out using 6 μl of a dispersion of gold nanoparticles (FIG. 11a) with a diameter of 5 nm commercially available, purchased from Strem Chemicals, n. of catalog 79-0180 (reagent g), and applying a potential of −0.1 V vs Ag/AgCl (FIG. 11b), For the measurement, a working solution consisting from an acetate buffer 0.1 M at pH 5.4 was used (FIG. 11c), and an ionic strength of 0.1M (FIG. 11d); applying to the electrodes a potential of −0.1 V vs Ag/AgCl.

Using operating parameters described above, a functionalized electrode was obtained.

The peracetic acid electrode according to the invention, was characterized by the analytical point of view to determine the linear range, sensitivity and inter- and intra-electrode repeatability. The calibration curve was obtained by reporting the mean value (n=3) of current recorded as a function of the concentration of peracetic acid in acetate buffer solution 0.1 M pH=5.4, applying, during the amperometric tests a potential of −0.1 V, achieving a sensitivity of 4.21±0.09 nA/μM and RSD %=2%.

From the data obtained, an excellent intra and inter repeatability was observed (FIG. 12); the sensor, according to the invention, was able to detect a concentration range of peracetic acid between 20 and 1000 μM (from 1.5 to 76 ppm).

The limit of detection (LOD) and LOQ of the sensor, according to the invention, were calculated and they resulted to be 1 and 3 μM, respectively.

Finally, the sensor according to the invention also proved its suitability in pool water. Because pool water is a complex matrix, it was necessary to dilute the sample and the dilution factor chosen, as a compromise between sensitivity and low matrix effect, was equal to 1:4 v/v in buffer solution.

The sensitivity obtained was 6.06±0.03 nA/μM up to 1000 μM.

The accuracy of the sensor was evaluated with the recovery method, obtaining a percentage recovery of 96.4±0.6%, demonstrating the accuracy of the sensor, according to the invention tested.

EXAMPLE 8

Procedure for Preparing a Functionalized Sensor Useful for Measuring Peracetic Acid Where the Working Electrode and the Reference Electrode are Prepared, During the Process of Printing, Using an Ink Containing Metal For the preparation of the functionalized sensor for measuring peracetic acid, the non-functionalized sensor or electrode was used as "starting product", for whose working electrode an ink based on gold microparticles was used.

For the measurement, a working solution consisting of 0.05 M acetate buffer or Britton-Robinson buffer at pH 5.4 and an ionic strength of 0.05 M was used; applying to the electrodes a potential of −0.2 V vs Ag/AgCl.

Using this electrode linear range and inter-electrode repeatability were calculated, which were respectively 5-2000 μM (0.4-150 ppm), and 10%.

Furthermore, the LOD and LOQ were calculated and they resulted to be 0.8 and 2.5 μM, respectively.

EXAMPLE 9

Evaluation of the Interference of Ions Present in the Liquids to be Analyzed Using the Electrode or Sensor of Example 1

The expert of the art knows that in waters intended for human consumption are present ions such as: $NO_3^-$, $SO_4^{2-}$, $CO_3^{2-}$, $HCO_3^-$ and $Cl^-$, which could interfere in the sensor response; these ions may be present in swimming pool waters during maintenance treatments.

The study was performed to assess whether the presence or the absence of ions above mentioned could interfere with the measurement, using the sensor of Example 1.

The results reported in FIG. 7, show that the presence of these ions did not modify the sensor response to the analyte and especially, the sensor did not show an electrochemical response to them at the concentrations tested

EXAMPLE 10

Printed Electrochemical Sensors and Probes for the Continuous Analysis of Chemical Species in In-Line Fluids (Pool Water)

The probes obtained shown in FIGS. 1*b-e* were connected to the electronic part to carry out in line measurements. For greater precision and repeatability of the reading, the probe was inserted into a suitable probe holder equipped with a flow meter, through which it was possible to check the liquid flow parameters, such as pressure, flow, temperature, etc., see FIGS. 1*b*, 1*c* and 1*d*.

The invention claimed is:

1. Method for preparing an electrochemical sensor nano- and/or micro-structured for measuring in water an analyte selected from the group consisting of: chlorine dioxide, free chlorine, total chlorine and peracetic acid; said electrochemical sensor comprising at least a printed electrodes group;
   wherein said printed electrodes group comprises at least a working electrode, at least a reference electrode, and at least an auxiliary electrode;
   wherein said printed electrodes group is printed on a support (5) using an ink containing carbon based material; and/or nano or microparticles of a metal selected from the group consisting of gold, silver, platinum, copper and combinations or alloys thereof,
   said electrochemical sensor comprising at least a reservoir (12); at least a hydrophobic or hydrophilic membrane (11); and at least an electrolytic gel;
   wherein said support (5) contains at least one hole (21) in a region where the printed electrodes group is not printed that allows the electrolytic gel or solution contained in the reservoir (12) to pass through and to act as contacting electrolyte;
   said method comprising printing on said support (5) in a region where the at least one hole is (21) not comprised, the reference electrode, the working electrode, and the auxiliary electrode;
   and wherein said at least one hole (21), contained in the support (5), is in the region where the printed electrodes group is not printed.

2. The method of claim 1, wherein the working electrode at the end of the printing process is functionalised by drop-casting.

3. The method of claim 2, wherein the working electrode is functionalised by depositing on its surface drops of a liquid that contains nano- or microparticles of carbon black and/or nano- or microparticles of a metal selected from the group consisting of gold, silver, platinum, copper and combinations or alloys thereof and allowing such liquid to solidify or to evaporate.

4. The method of claim 1, wherein the carbon based material is selected from the group comprising graphite or carbon black.

5. The method of claim 1, wherein the metallic nano or microparticles have an average diameter of from 20 to 0.05 μm.

6. The method of claim 1, wherein the metallic nano or microparticles have an average diameter of from 10 to 0.3 μm.

7. The method of claim 1, wherein the metallic nano or microparticles have an average diameter of 1 μm.

* * * * *